(12) United States Patent
Yoshida et al.

(10) Patent No.: US 6,781,412 B2
(45) Date of Patent: Aug. 24, 2004

(54) LOGIC CIRCUIT FOR FAST CARRY/BORROW

(75) Inventors: Shuji Yoshida, Kawasaki (JP); Daisuke Miura, Kawasaki (JP); Toshio Arakawa, Kawasaki (JP); Mitsuaki Nagasaka, Kawasaki (JP); Kenji Yoshida, Kawasaki (JP); Hiroyuki Honda, Kawasaki (JP); Kenji Kobayashi, Nagoya (JP); Masayuki Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 220 days.

(21) Appl. No.: 10/073,132

(22) Filed: Feb. 13, 2002

(65) Prior Publication Data

US 2002/0188641 A1 Dec. 12, 2002

(30) Foreign Application Priority Data

Apr. 13, 2001 (JP) ........................ 2001-116174

(51) Int. Cl.[7] .............................................. H03K 19/21
(52) U.S. Cl. .............................. 326/53; 326/52; 326/55; 326/113
(58) Field of Search ................................ 326/52–1, 55, 326/113

(56) References Cited

U.S. PATENT DOCUMENTS

4,707,800 A * 11/1987 Montrone et al. .......... 708/714
4,905,179 A * 2/1990 Licciardi et al. ............ 708/707

FOREIGN PATENT DOCUMENTS

| JP | 01-293436 | 11/1989 |
| JP | 05-061645 | 3/1993 |

* cited by examiner

*Primary Examiner*—Anh Q. Tran
(74) *Attorney, Agent, or Firm*—Arent Fox PLLC

(57) ABSTRACT

Each binary carry logic circuit 20 of half adder circuits other than that for the least significant digit comprises a transfer gate 212 turned on when an input bit A2 is active and receiving a carry-in bit *C2 at its data input, and a transistor 23, turned on when the input bit A2 is inactive, connected between a power supply potential VDD and the data output of the transfer gate 212 a signal on which is a carry-out bit *C3. Transfer gates 212 to 214 of binary carry logic circuits other than that for the least significant digit are connected in chain, and are simultaneously on/off controlled by input bits A2 to A4, letting the carry-in bit *C2 from the least significant digit propagate through the transfer gate chain at a high speed.

8 Claims, 13 Drawing Sheets

LOGIC CIRCUIT FOR FAST CARRY/BORROW

BACKGROUND OF THE INVENTION

1. Field of the Invention

The present invention relates generally to a logic circuit for fast carry or borrow, more particularly, to a logic circuit for use in an incrementer or decrementer having a transfer gate chain for carry or borrow propagation.

2. Description of the Related Art

FIG. 11 shows a prior art ripple carry type incrementer.

This incrementer asynchronously adds a bit C1 ="1" to 4 bit inputs A1 to A4 to obtain 5 bit outputs D1 to D4 and C5. A circuit for each digit is a half adder, and each half adder has the same configuration. A half adder circuit 10 for the least significant digit consists of: an exclusive-OR gate 11 whose output bit D1 takes on '1' when either input bit A1 or C1 is '1' and the other is '0'; and an AND gate 12 whose output bit C2 as a carry-out bit to the upper digit takes on '1' when the both input bits A1 and C1 are '1'.

Although such a ripple carry type circuit is simple in configuration and can be down-sized on circuit scale, since a carry-in from the lower digit at each digit is logically operated by an AND gate, determination of a carry-out bit C5 is delayed, resulting in a low speed operation. For example, when the input bits A4 to A1 ='1111' is provided in a state C1='1', carries C2 to C5 sequentially change to '1', and therefore determination of the output value '10000' is delayed.

FIG. 12 shows a binary carry logic circuit 12A for use in a full adder disclosed in JP 05-61645 A.

This circuit 12A consists of: transfer gates 13 to 15; and inverters 16 to 18. When A1='0', the transfer gates 13 and 14 are on and off, respectively to be D1=C1. When A1='1', the transfer gates 13 and 14 are turned off and on, respectively to be D1=*C1, where the symbol * denotes an inverse operator. From these relations, the transfer gates 13 and 14 and the inverters 16 and 17 constitutes an exclusive-OR gate 11A.

When the output bit D1'0', that is, when the input bit A1 and the carry-in bit C1 from the lower digit are both '1', the transfer gate 15 is on to be C2=A1.

According to such a binary carry logic circuit 12A, since the input bit A1 passes through the transfer gate 15 to be the carry-out bit C2 to the upper digit, it seems that the operation is fast. However, the carry-in bit C1, for example, turns on the NMOS transistor of the transfer gate 15 through the inverter 16, the transfer gate 14 and then the inverter 18, which is an obstacle against a high speed operation.

FIG. 13 shows a prior art ripple carry type decrementer.

A half subtractor circuit 10X for the least significant digit is of the same configuration as the half adder circuit 10 with the exception that an inverter 19 is connected between the input bit A1 and one input of the AND gate 12. A borrow B2, which is an output of the AND gate 12, takes on '1' when the input bit A1='0' and a borrow B1='1'.

Although this decrementer is also of a simple configuration like the incrementer of FIG. 11 to enable a circuit scale to be downsized, since a borrow-in bit from the lower digit at each digit is logically operated in an AND gate, determination of a borrow B5 is delayed, resulting in a low speed operation.

On the other hand, a carry look ahead type incrementer and a carry look ahead type decrementer are faster in operation than those of a ripple carry type. However, the circuit scale thereof is larger.

In such a way, in regard to an incrementer and a decrementer, there is a trade-off relation between a high speed operation and downsizing on circuit scale.

SUMMARY OF THE INVENTION

Accordingly, it is an object of the present invention to provide a logic circuit for fast carry or borrow capable of achieving a high speed operation while maintaining an advantage of a ripple carry type with a small circuit scale.

In one aspect of the present invention, there is provided an incrementer comprising a plurality of half adder circuits each adding a carry-in bit to an input bit to generate an output bit and a carry-out bit, the plurality of half adder circuits being connected in cascade in regard to the carry-in and carry-out bits. Each of the half adder circuits other than one for the least significant digit comprises: a transfer gate, having a data input and a data output, turned on when the input bit is active, the data input receiving the carry-in bit; a transistor, having a current channel connected between a power supply potential and the data output, a logic value of the power supply potential being equal to that of the carry-in bit in an inactive state, turned on when the input bit being inactive; and a logic circuit, generating the output bit which is active when either the input bit or the carry-in bit is active; wherein the carry-out bit is on the data output.

With this configuration, since the transfer gates of the half adder circuits other than one for the least significant digit are connected in series to each other and the transfer gates are simultaneously on/off controlled by input bits, a carry bit from the least significant digit can propagate through a transfer gate chain at a high speed in the worst case.

In another aspect of the present invention, there is provided a decrementer comprising a plurality of half subtractor circuits each subtracting a borrow-in bit from an input bit to generate an output bit and a borrow-out bit, the plurality of half subtractor circuits being connected in cascade in regard to the borrow-in and borrow-out bits. Each of the half subtractor circuits other than one for the least significant digit comprising: a transfer gate, having a data input and a data output, turned on when the input bit is inactive, the data input receiving the borrow-in bit; a transistor, having a current channel connected between a power supply potential and the data output, a logic value of the power supply potential being equal to that of the borrow-in bit in an inactive state, turned on when the input bit being active; and a logic circuit, generating the output bit which is active when either the input bit or the borrow- in bit is active; wherein the borrow-out bit is on the data output.

With this configuration, since the transfer gates of the half subtractor circuits other than one for the least significant digit are connected in series to each other and the transfer gates are simultaneously on/off controlled by input bits, a borrow from the least significant digit can propagate through a transfer gate chain at a high speed in the worst case.

Other aspects, objects, and the advantages of the present invention will become apparent from the following detailed description taken in connection with the accompanying drawings.

DESCRIPTION OF THE PREFERRED EMBODIMENTS

Figure 1:
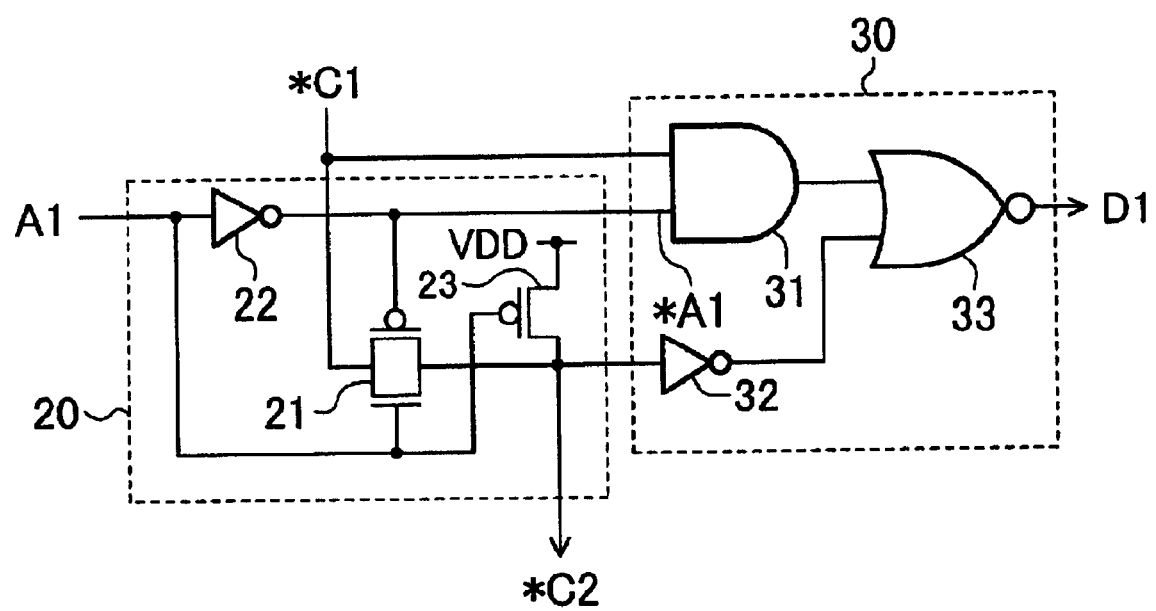
FIG. 1 is a circuit diagram showing a half adder of a first embodiment according to the present invention.

Referring now to the drawings, wherein like reference characters designate like or corresponding parts throughout several views, preferred embodiments of the present invention are described below.

First Embodiment FIG. 1 shows a half adder circuit of the first embodiment according to the present invention for use in, for example, an incrementer or an adder.

Figure 12:
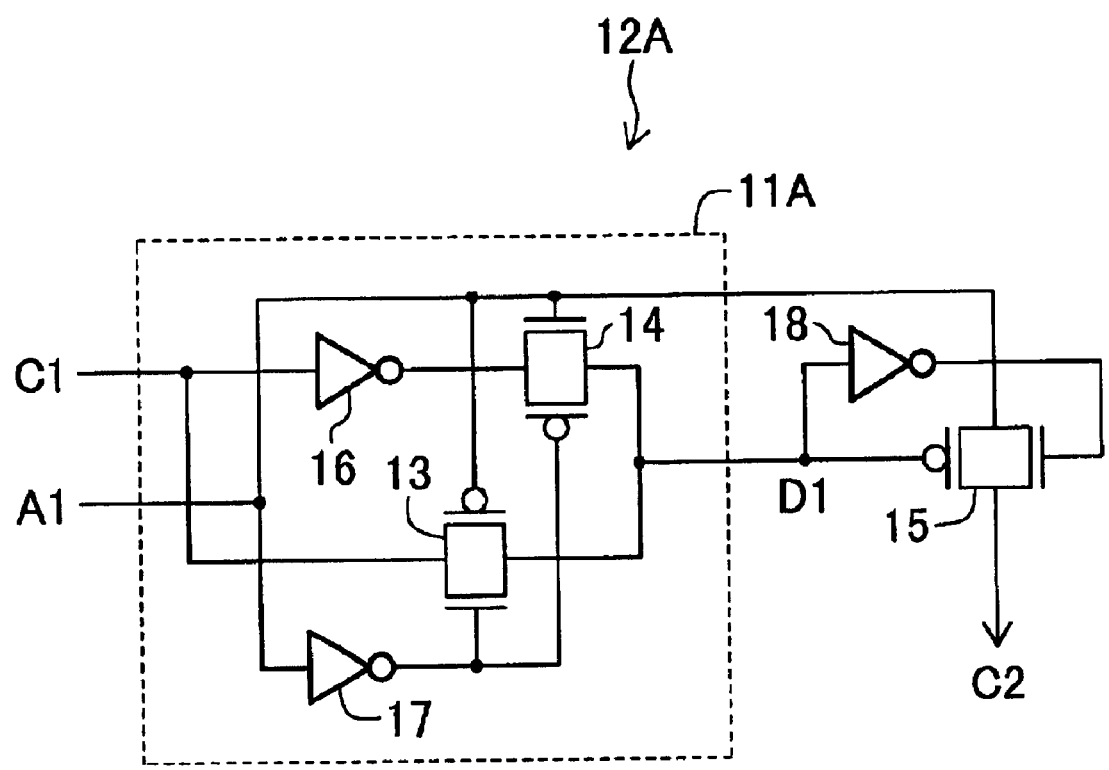
FIG. 12 is a diagram showing a prior art binary carry logic circuit using transfer gates.
Figure 13:
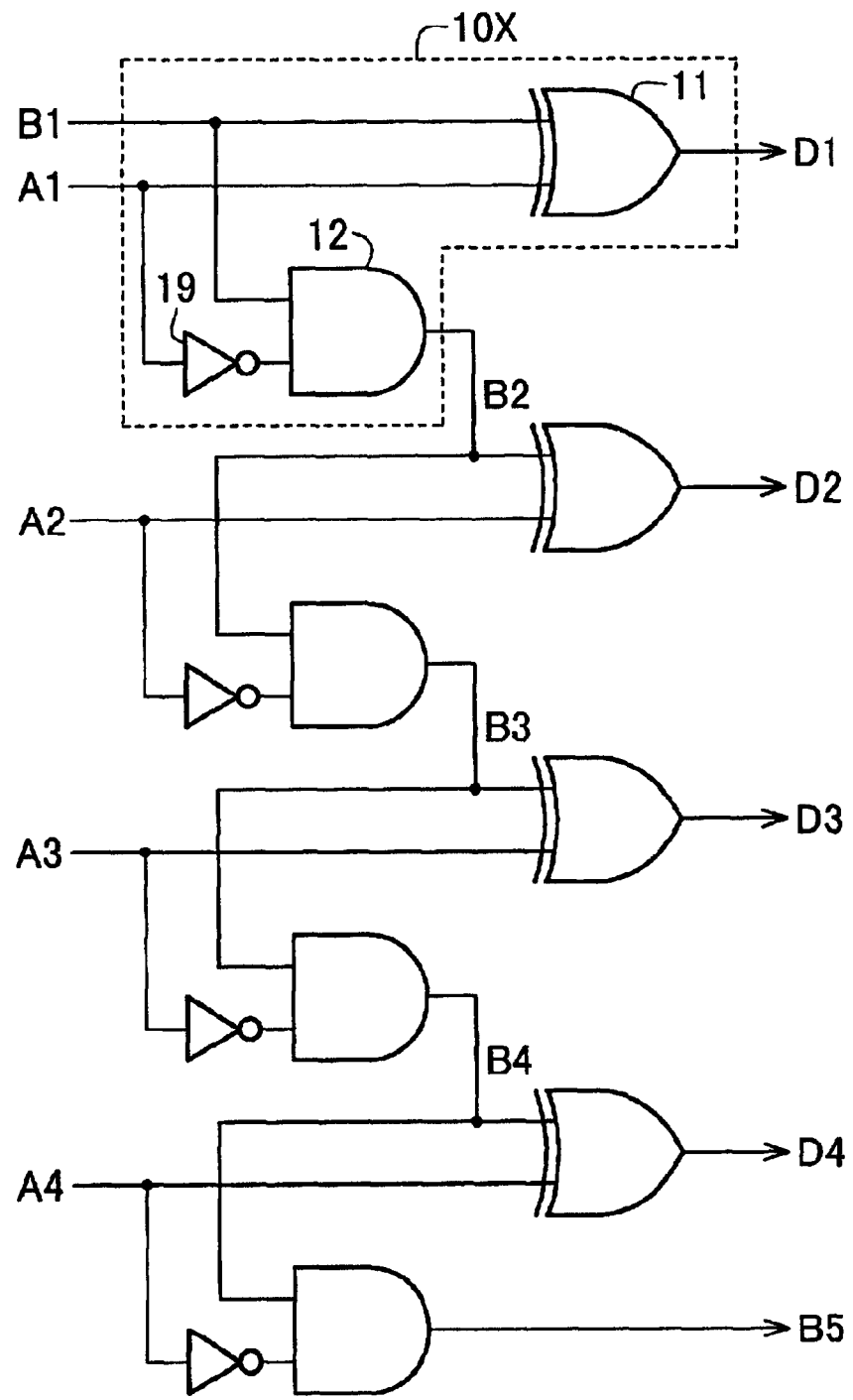
FIG. 13 is a logic circuit diagram showing a prior art ripple carry type decrementer.

A binary carry logic circuit 20 consists of a transfer gate 21, an inverter 22, and a PMOS transistor 23, and has a configuration simpler than the binary carry logic circuit 12A of FIG. 12.

The transfer gate 21 is a pair of an NMOS transistor and a PMOS transistor connected in parallel with each other, the NMOS transistor receives an input bit A1 at its gate, and the PMOS transistor receives, at its gate, a signal *A1 obtained by inverting the input bit A1 with the inverter 22, where the symbol* denotes a reverse operator and a signal indicated by a reference character having * is active-low, which applies in the following description as well. A carry-in bit *C1 from the lower digit is provided to the data input of the transfer gate 21. The PMOS transistor 23 is connected between the data output of the transfer gate 21 and a power supply potential VDD, and receives the input bit A1 at its gate. A carry-out bit *C2 to the upper digit is the signal on the data output of the transfer gate 21.

In the above configuration, when A1='1', the transfer gate 21 and the PMOS transistor 23 are on and off, respectively, to be *C2=*C1. When A1='0', the transfer gate 21 and the PMOS transistor 23 are off and on, respectively, to be *C2='1' regardless of the value of the carry-in bit *C1. Accordingly, *C2=0 only when A1='1' and *C1='0', and *C2='1' in the other cases. That is, the following logic equation holds:

$$C2 = A1 \cdot C1. \tag{1}$$

Features of the binary carry logic circuit 20 in configuration are that on/off of the transfer gate 21 is reverse to that of the PMOS transistor 23, and that the logic value of the source potential, VDD, of the PMOS transistor 23 is equal to that of the carry-in bit *C1 which is in an inactive state.

In a logic circuit 30, the carry-in bit *C1 and the input signal *A1 are provided to an AND circuit 31, the carry-out bit *C2 to the upper digit is provided to an inverter 32, the outputs of the AND gate 31 and the inverter 32 are provided to a NOR gate 33, and the output bit D1 is taken out from the NOR gate 33. The operation of the logic circuit 30 is represented by the following logic equation:

$$D1 = {}^*({}^*C1 \cdot {}^*A1 + C2)$$
$$= {}^*({}^*C1 \cdot {}^*A1) \cdot {}^*C2$$
$$= (C1 + A1) \cdot {}^*C2.$$

The above equation is transformed to the following equation using the equation (1):

$$D1 = (C1 + A1) \cdot ({}^*A1 + {}^*C1) \tag{2}$$
$$= C1 \cdot {}^*A1 + {}^*C1 \cdot A1.$$

Therefore, the output bit D1 is '1' when one of the input bit A1 or the carry-in bit C1 is '1' and the other is '0', while being '0' in the other cases.

With such operation, the circuit of FIG. 1 functions as a half adder.

Figure 2:
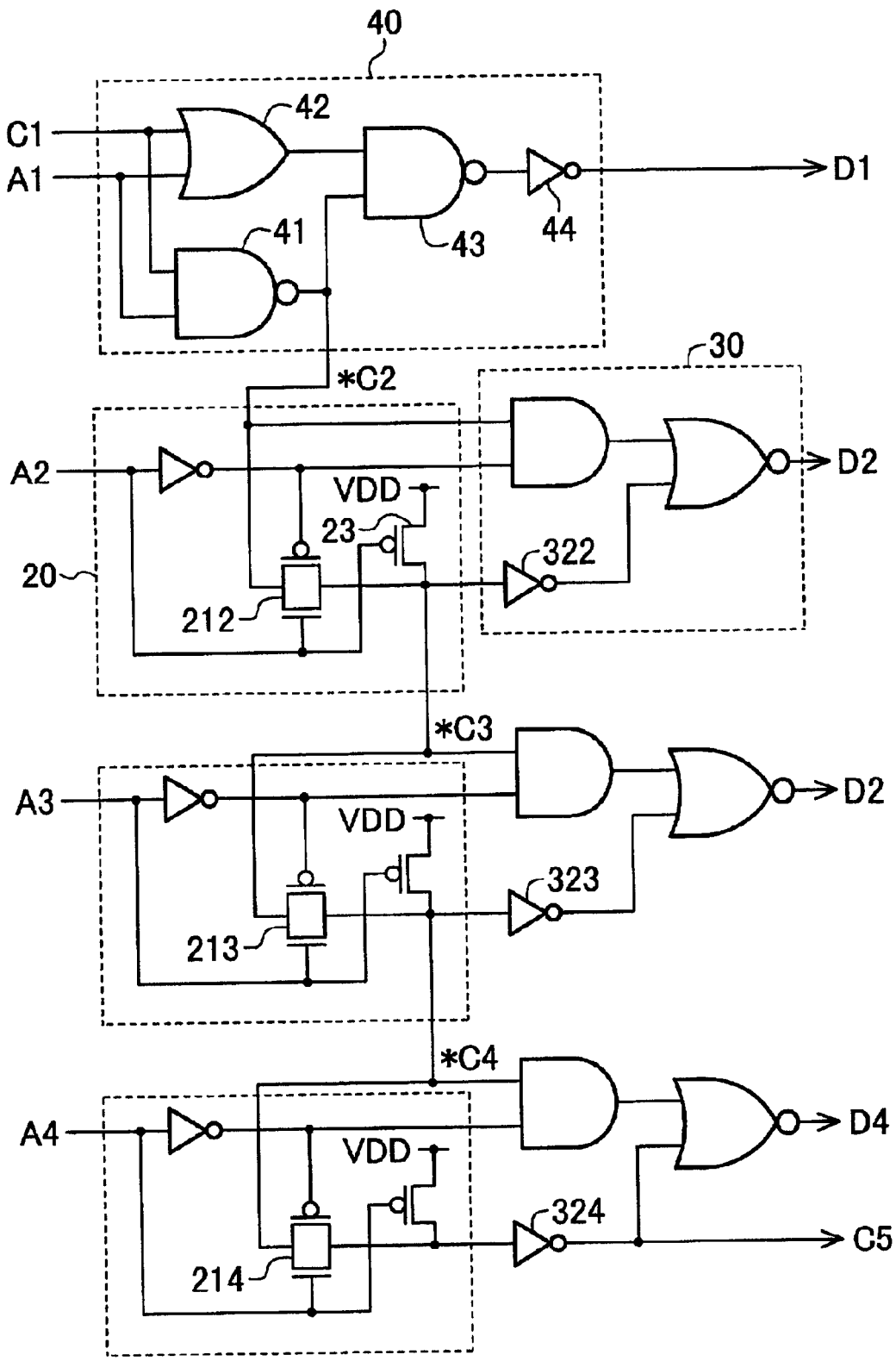
FIG. 2 is a circuit diagram showing a 4 bit incrementer to which the half adder circuit of FIG. 1 is applied.

FIG. 2 is a circuit diagram showing a 4 bit incrementer to which the half adder circuit of FIG. 1 is applied. Each of half adder circuits for the upper three digits is of the same configuration as that of FIG. 1. Transfer gates 212 to 214 of binary carry logic circuits 20 for the respective upper three digits are connected in series to each other. It is when input bits A1 to A4 are all '1' that carry propagation is delayed most. In this case, since the transfer gates 212 through 214 are simultaneously turned on, a carry bit *C2 from the least significant digit can propagate through the transfer gates 212 to 214 at a high speed. In order to accelerate this propagation to a higher speed, it is enough to steepen the slope of a fall of the carry bit signal *C2.

Therefore, in the half adder circuit 40 for the least significant digit, the carry-out bit *C2 is generated by a NAND gate driver 41 to which the input bit A1 and a fixed bit C1='1' are provided. Further, in order to effectively use the output of the NAND gate 41 to constitute an exclusive-OR gate, a carry-in bit C1 and an input bit A1 are provided to an OR gate 42, the outputs of the NAND gate 41 and the OR gate 42 are provided to a NAND gate 43 and the output thereof 43 is provided to an inverter 44 to take out an output bit D1. The operation of the half adder circuit 40 is represented by the following logic equation:

$$D1 = (C1 + A1) \cdot {}^*(C1 \cdot A1)$$
$$= (C1 + A1) \cdot ({}^*C1 + {}^*A1)$$
$$= C1 \cdot {}^*A1 + {}^*C1 \cdot A1.$$

Therefore, the half adder circuit 40 also functions as an exclusive-OR gate.

Although the edges of the carry bit signal *C2 is blunted by passing through the transfer gates 212 to 214, the waveform of the carry-out bit signal *C2 is shaped by an inverter 324 for the most significant digit to obtain a carry-out bit signal C5 with sharp edges.

Then, description will be given of a concrete comparison result between the circuits of FIGS. 2 and 11.

Figure 11:
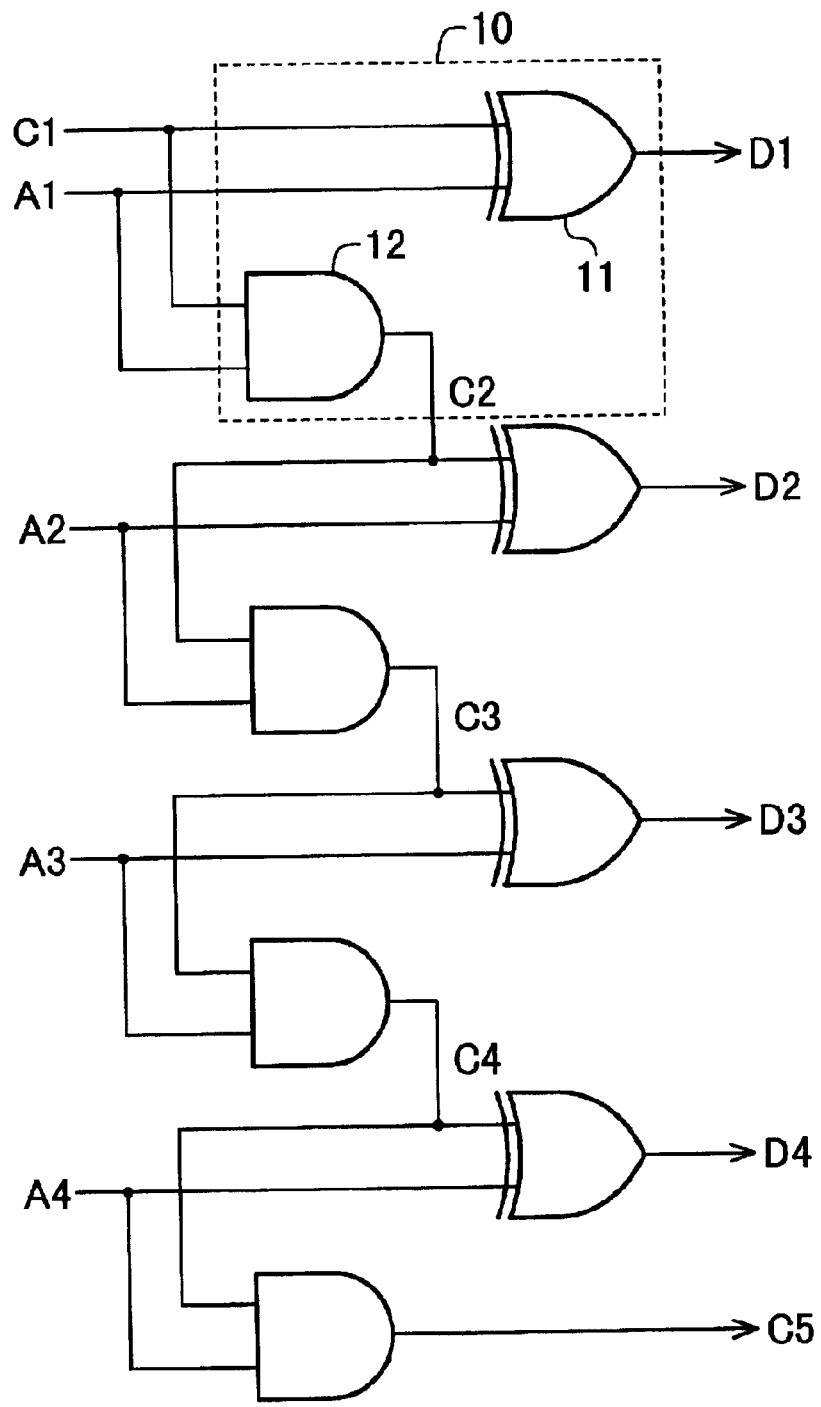
FIG. 11 is a logic circuit diagram showing a prior art ripple carry type incrementer.

Although fifty gates are necessary if the incrementer of FIG. 11 is constituted of an ordinary circuit, only thirty-six gates are necessary to constitute the circuit of FIG. 2. Further, the result of a simulation using virtual wiring capacitance in a 0.35 μm technology was such that a carry propagation time in the worst case wherein the input bits A4 to A1 are '1111' was 3.8 ns for the circuit of FIG. 11, while being 2.6 ns for the circuit of FIG. 2.

Figure 3:
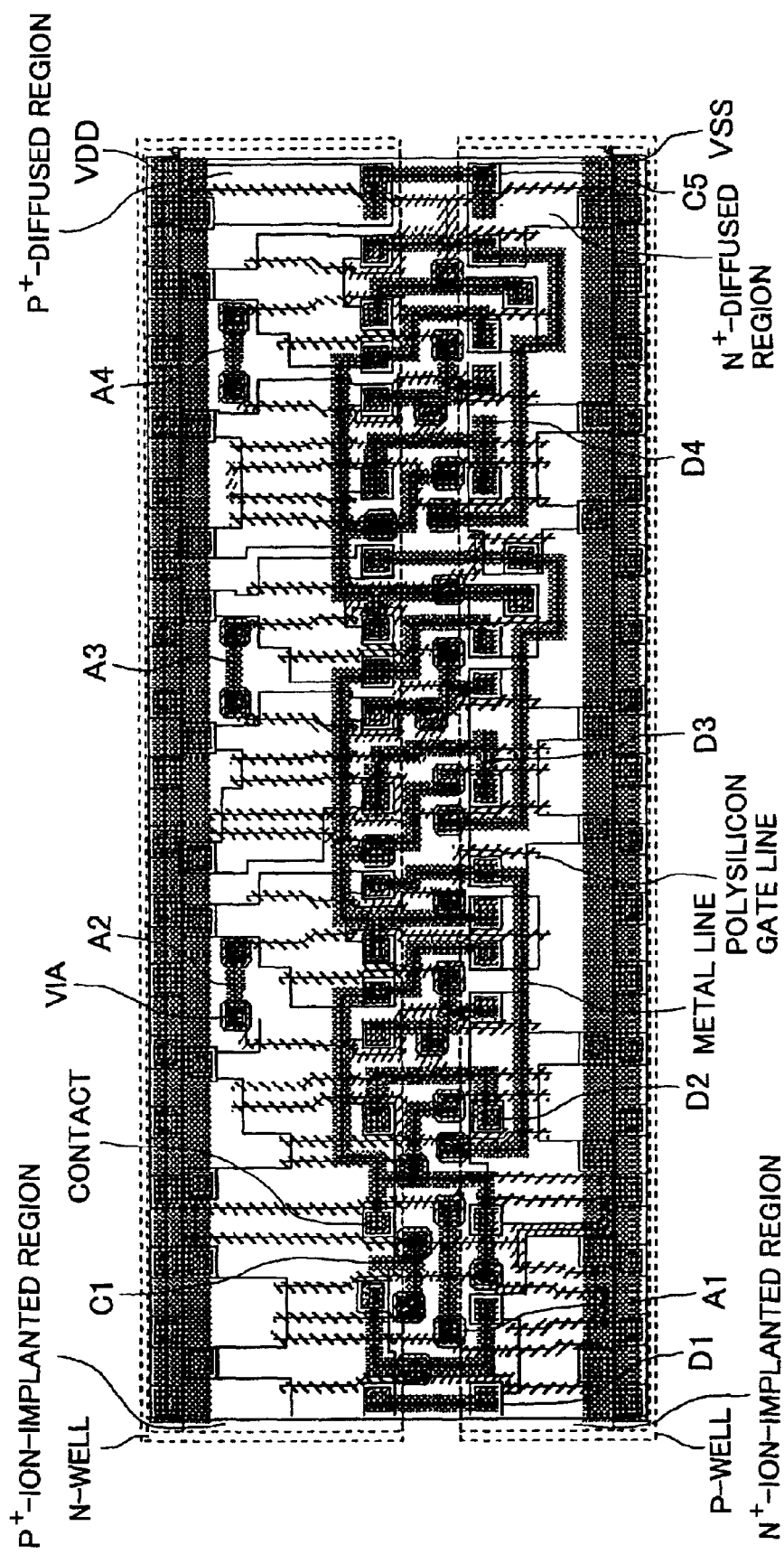
FIG. 3 is a layout representation of the circuit of FIG. 2.

FIG. 3 shows a layout representation of the circuit of FIG. 2 which was used in the above simulation. In FIG. 3, wires are each shown by center lines, widths of metal wires are shown by cross-hatchings and widths of polysilicon gates by hatchings. Each PMOS transistor in an N well includes a polysilicon gate and P type diffused regions on both sides of this polysilicon gate. Each NMOS transistor in a P well includes a polysilicon gate and N type diffused regions on both sides of this polysilicon gate. Each interlayer contact is shown in the shape of a square.

According to the incrementer of the first example, not only can a circuit scale be down-sized, but an operation can also be faster.

Figure 4:
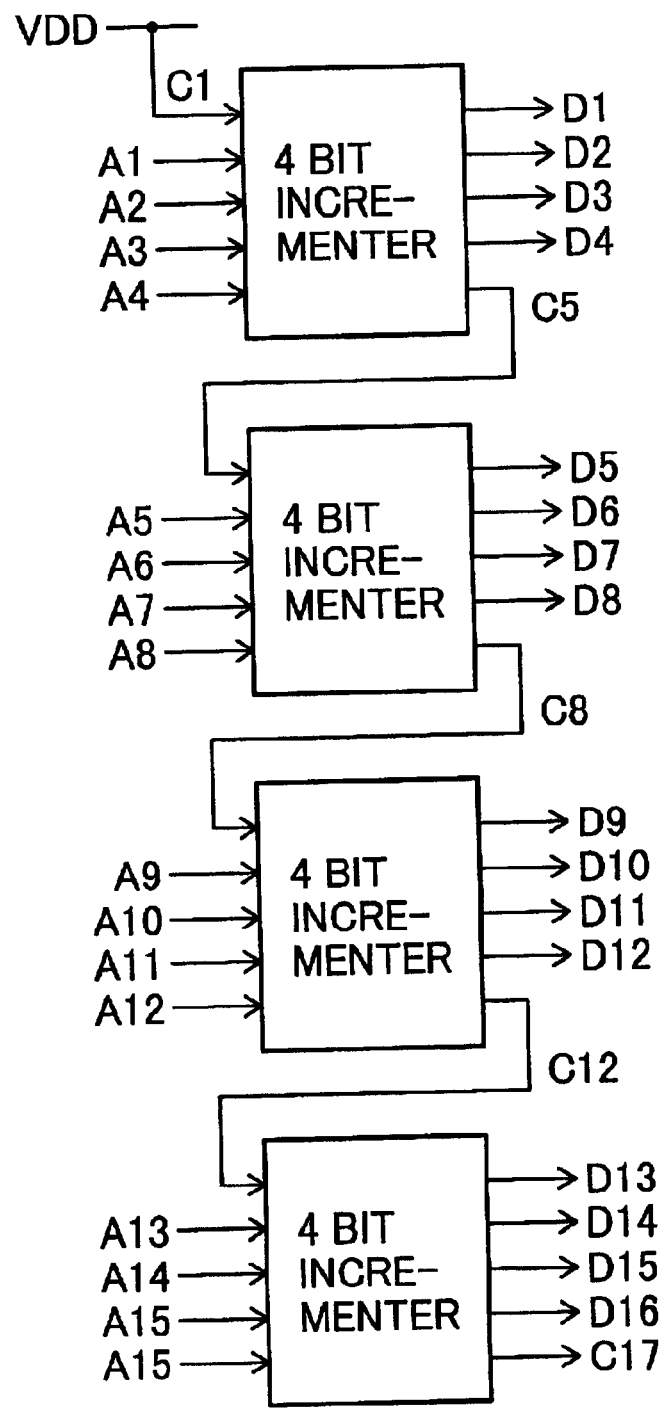
FIG. 4 is a block diagram showing a 16 bit incrementer constructed of four 4-bit incrementers, each having the configuration of FIG. 2, connected in cascade.

FIG. 4 is a block diagram showing a 16 bit incrementer constructed of four 4 bit incrementers of FIG. 2 connected in cascade.

The bit C1 is fixed at the power supply potential VDD and when 16 bit inputs A1 to A16 are provided, 17 bit outputs D1 to D16 and C17 are asynchronously obtained by adding the C1='1' to the 16 bit inputs A1 to A16. Since the carries C5, C8, C12 and C17 outputted from the most significant digits of the respective 4 bit incrementers have enough driving abilities by respective inverters (324), reduction in operation speed due to blunting of signals is prevented from occurring.

Second Embodiment

Figure 5:
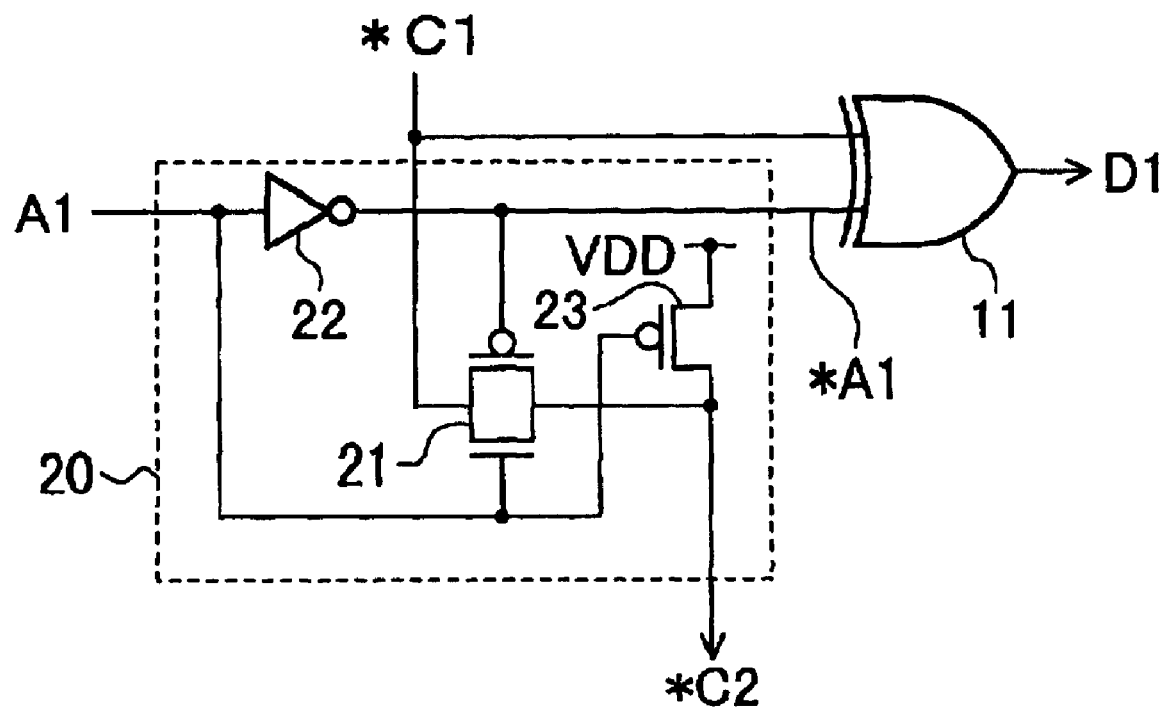
FIG. 5 is a circuit diagram showing a half adder of a second embodiment according to the present invention.

FIG. 5 shows a half adder circuit of the second embodiment according to the present invention.

In this circuit, the bits *C1 and *A1 are provided to an exclusive-OR gate 11 to generate an output bit D1, wherein the carry-out bit *C2 is not used for generation of the output bit D1. The other points are the same as those of the circuit of FIG. 1.

Figure 6:
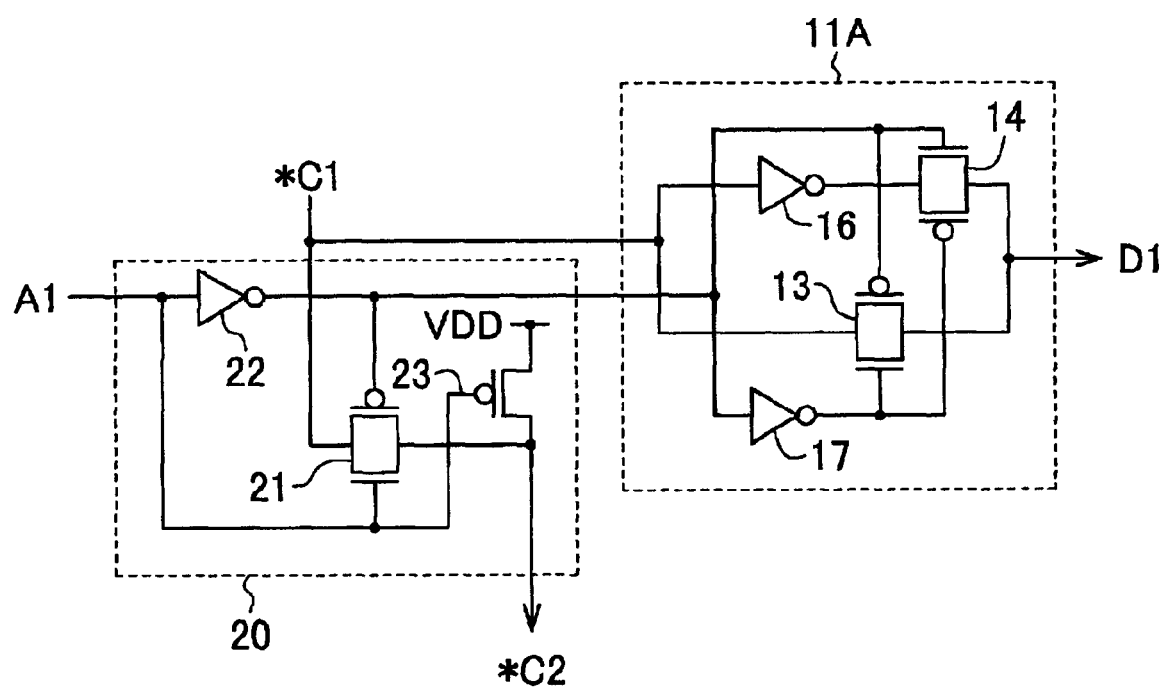
FIG. 6 is a circuit diagram showing an example of FIG. 5 wherein the exclusive OR gate is constructed using transfer gates.

FIG. 6 shows an example of FIG. 5 wherein the exclusive OR gate is of the same configuration as the circuit 11A in FIG. 12.

Figure 7:
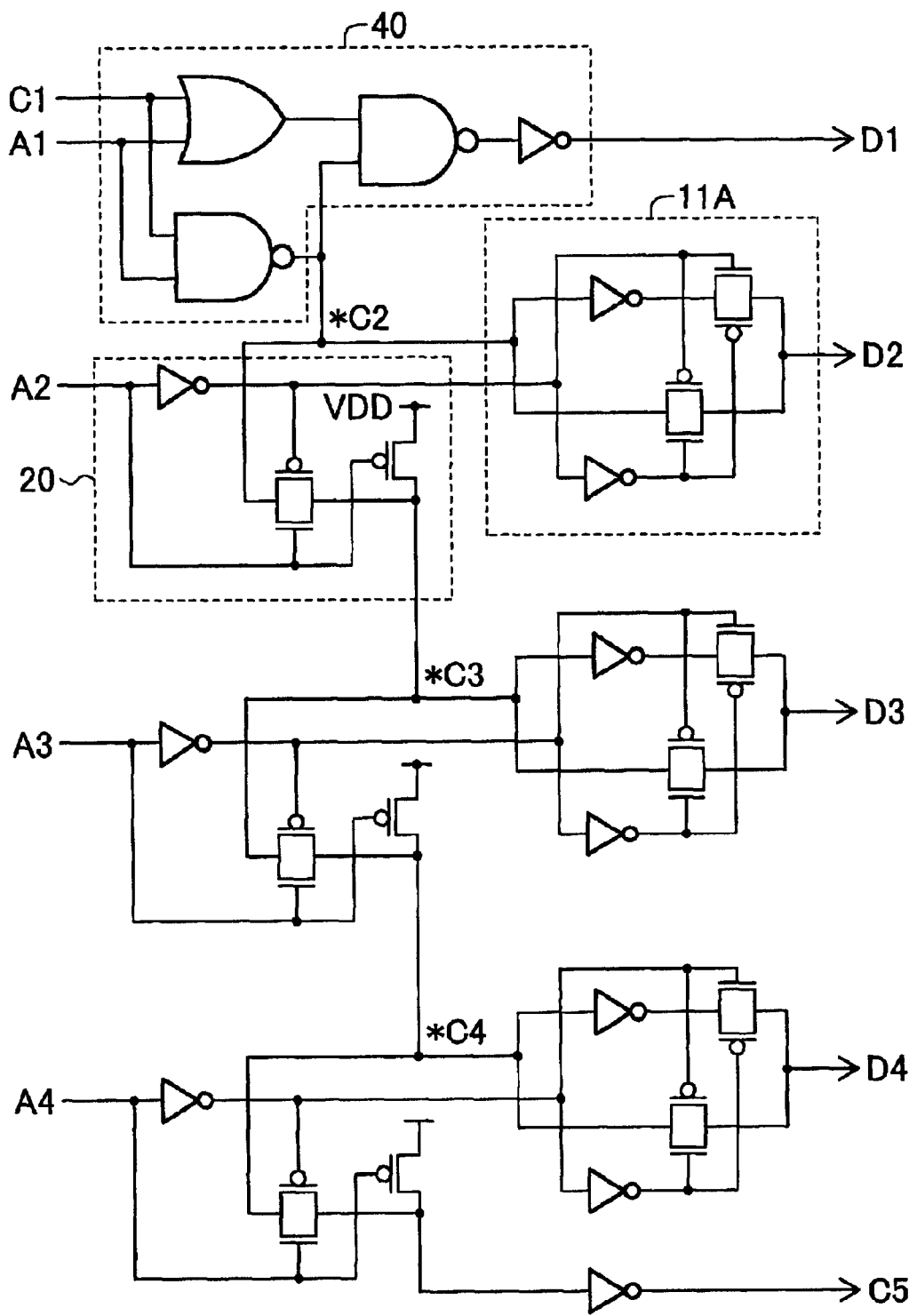
FIG. 7 is a circuit diagram showing a 4 bit incrementer to which the half adder circuit of FIG. 6 is applied.

FIG. 7 is a circuit diagram showing a 4 bit incrementer to which the half adder circuit of FIG. 6 is applied. A half adder circuit 40 for the least significant digit is the same as that of FIG. 2.

Since the operation of this circuit is apparent from the above description, description thereof is omitted.

Third Embodiment

Figure 8:
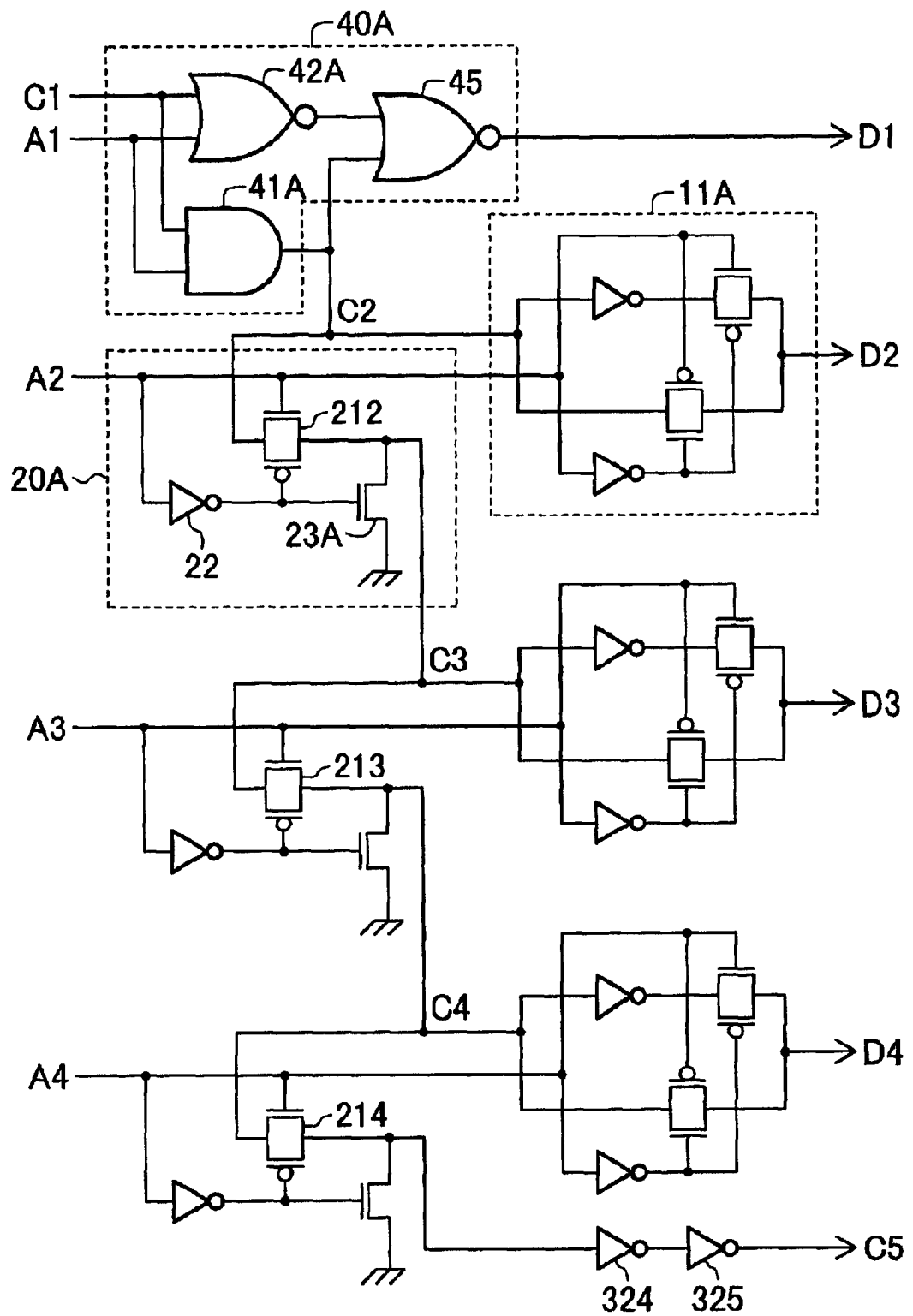
FIG. 8 is a circuit diagram showing an incrementer of a third embodiment according to the present invention.

FIG. 8 shows an incrementer of the third embodiment according to the present invention.

Since transfer gates 212 to 214 of binary carry logic circuits for the upper three digits are connected in series to each other similarly to FIG. 7, high speed carry propagation is achieved. A feature of this circuit is that carries to the upper digits are all non-inverted signals.

In a half adder circuit 40A for the least significant digit, an AND gate 41A is used instead of the NAND gate 41 of FIG. 2.

In order to effectively use the output of this AND gate 41A in constitution of an exclusive-OR gate, a fixed bit C1='1' and an input bit A1 are provided to a NOR gate 42A, the outputs of the AND gate 41A and the NOR gate 42A are provided to a NOR gate 45, and an output bit D1 is taken out from the NOR gate 45. The operation of the half adder circuit 40A is represented by the following logic equation:

$$D1 = {}^*({}^*(C1+A1)+C1 \cdot A1)$$
$$= (C1+A1) \cdot ({}^*C1+{}^*A1)$$
$$= C1 \cdot {}^*A1 + {}^*C1 \cdot A1.$$

Therefore, the half adder circuit 40A also functions as an exclusive-OR gate.

Each binary carry logic circuit 20A for the other digits is different from the circuit 20 of FIG. 1 in that an NMOS transistor 23A is connected between the data output of the transfer gate 212 and ground, and that the output of the inverter 22 is provided to the gate of the NMOS transistor 23A.

When A2='1', the transfer gate 212 and the NMOS transistor 23A are on and off, respectively, to be C3=C2. When A2='0', the transfer gate 212 and the NMOS transistor 23A are off and on, respectively, to be C3='0' regardless of the value of a carry-in bit C2 from the lower digit. Therefore, C3='1' only when A2='1' and C2='1', and C3='0' in the other cases. That is, the binary carry logic circuit functions as an AND gate.

Features of the binary carry logic circuit 20A in configuration are that on/off of the transfer gate 212 is reverse to that of the NMOS transistor 23A, and that the logic value of the source potential, 0V, of the NMOS transistor 23A is equal to that of the carry-in bit C2 which is in an inactive state, which are the same as those of the above described circuit of FIG. 1.

The carry-in bit C2 and the input bit A2 are provided to the exclusive-OR gate 11A.

Further, the output data signal of the transfer gate 214 for the most significant digit becomes a carry-out bit signal CS whose waveform has been shaped through inverters 324 and 325.

Since the operation of this circuit is apparent from the above description, description thereof is omitted.

Figure 9:
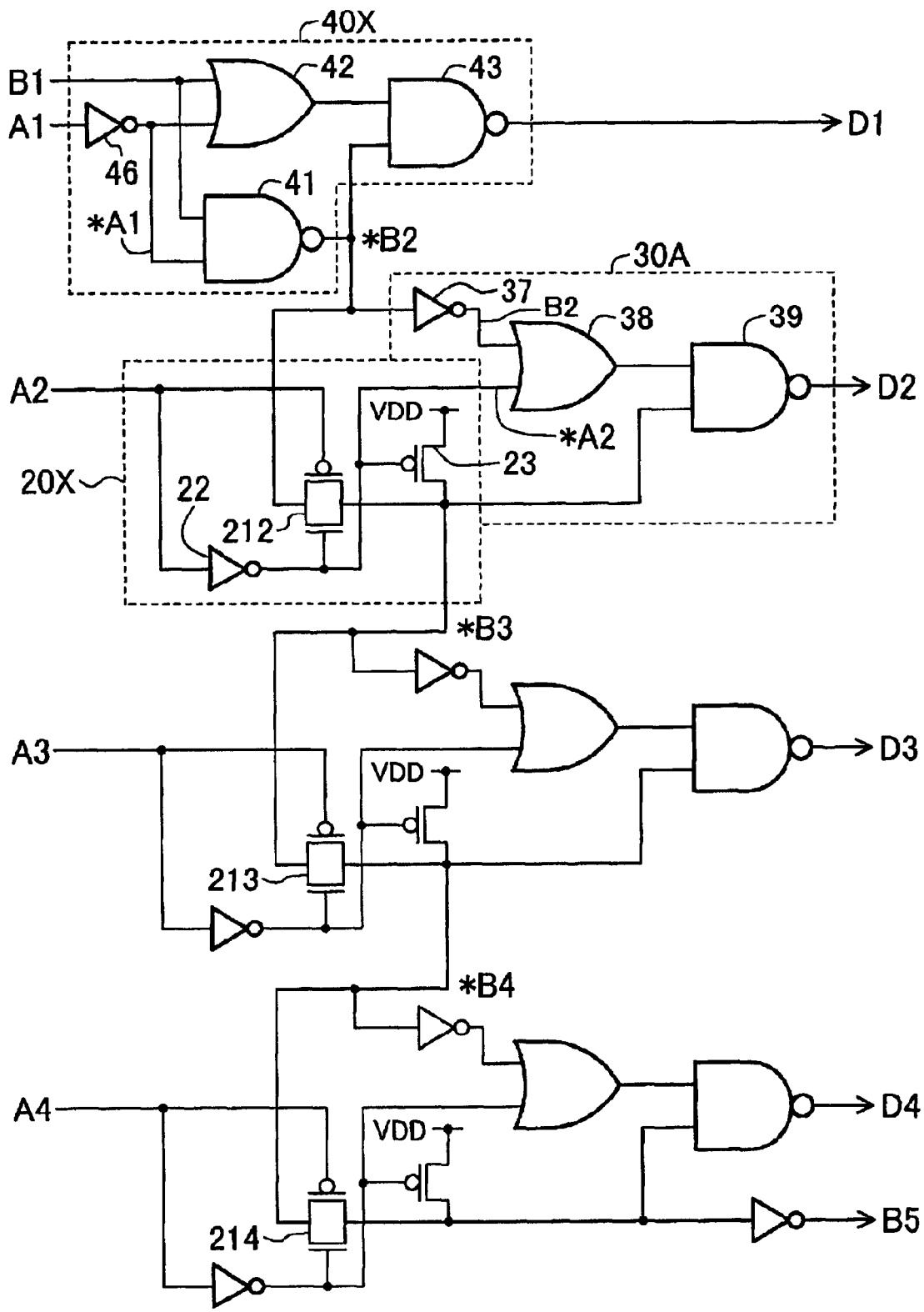
FIG. 9 is a circuit diagram showing a decrementer of a fourth embodiment according to the present invention.

Fourth Embodiment FIG. 9 shows a decrementer of the fourth embodiment according to the present invention.

Since in this circuit, transfer gates 212 to 214 of binary borrow logic circuits 20X for the upper three digits are connected in series to each other, borrow propagation is achieved at a high speed.

In a half subtractor circuit 40X for the least significant digit, a borrow-out bit *B2 is generated by a NAND gate 41 and an inverter 46 with using an input bit A1 and a fixed bit B1='1', and *B2='0' only when A1='0' and B1='1'.

Further, in order to effectively use the outputs of the inverter 46 and the NAND gate 41 in constitution of an exclusive-OR gate, B1 and the output *A1 of the inverter 46 are provided to an OR gate 42, the outputs of the NAND gate 41 and the OR gate 42 are provided to a NAND gate 43 and an output bit D1 is taken out from the NAND gate 43. The operation of the half subtractor circuit 40X is represented by the following logic equation:

$$D1 = {}^*((B1+{}^*A1) \cdot {}^*(B1 \cdot {}^*A1))$$
$$= {}^*(B1+{}^*A1) + (B1 \cdot {}^*A1)$$
$$= {}^*B1 \cdot A1 + B1 \cdot {}^*A1.$$

Therefore, the half subtractor circuit 40X also functions as an exclusive-OR gate.

A binary borrow logic circuit 20X has such connections that the on/off operation for an input bit A2 is inverse to that of the binary carry logic circuit 20 of FIG. 2.

When A2='0', the transfer gate 212 and a PMOS transistor 23 are on and off, respectively, to be *B3=*B2. When A2='1', the transfer gate 212 and the PMOS transistor 23 are off and on, respectively, to be *B3='1' regardless of the value of the borrow-in bit *B2. Therefore, *B3='0' only when A2='0' and *B2='0', and *B3='1' in the other cases. That is, the following logic equation holds:

$$B3 = {}^*A2 \cdot B2. \tag{3}$$

Features of the binary borrow logic circuit 20X in configuration are that on/off of the transfer gate 212 is reverse to that of the PMOS transistor 23, and that the logic value of the source potential, VDD, of the PMOS transistor 23 is equal to that of the borrow *B2 which is in an inactive state, which are the same as those of the above described circuit of FIG. 1.

In a logic circuit 30A, a borrow B2 obtained by inverting the borrow *B2 with an inverter 37 and the output *A2 of the inverter 22 are provided to an OR gate 38, the output of the OR gate 38 and the borrow *B3 are provided to a NAND gate 39, and an output bit D2 is taken out from the NAND gate 39. The operation of the logic circuit 30A is represented by the following logic equation:

$$D2 = {}^*((B2 + {}^*A2) \cdot {}^*B3)$$
$$= {}^*B2 \cdot A2 + B3.$$

The above equation is transformed to the following equation using the equation (3):

$$D2 = A2 \cdot {}^*B2 + {}^*A2 \cdot B2. \tag{4}$$

With such operation, a circuit for each digit functions as a half subtractor.

Since the operation of the decrementer of FIG. 9 is apparent from the above description, description thereof is omitted.

With the decrementer of the fourth example, the effects similar to the first embodiment are also obtained.

Fifth Embodiment

Figure 10:
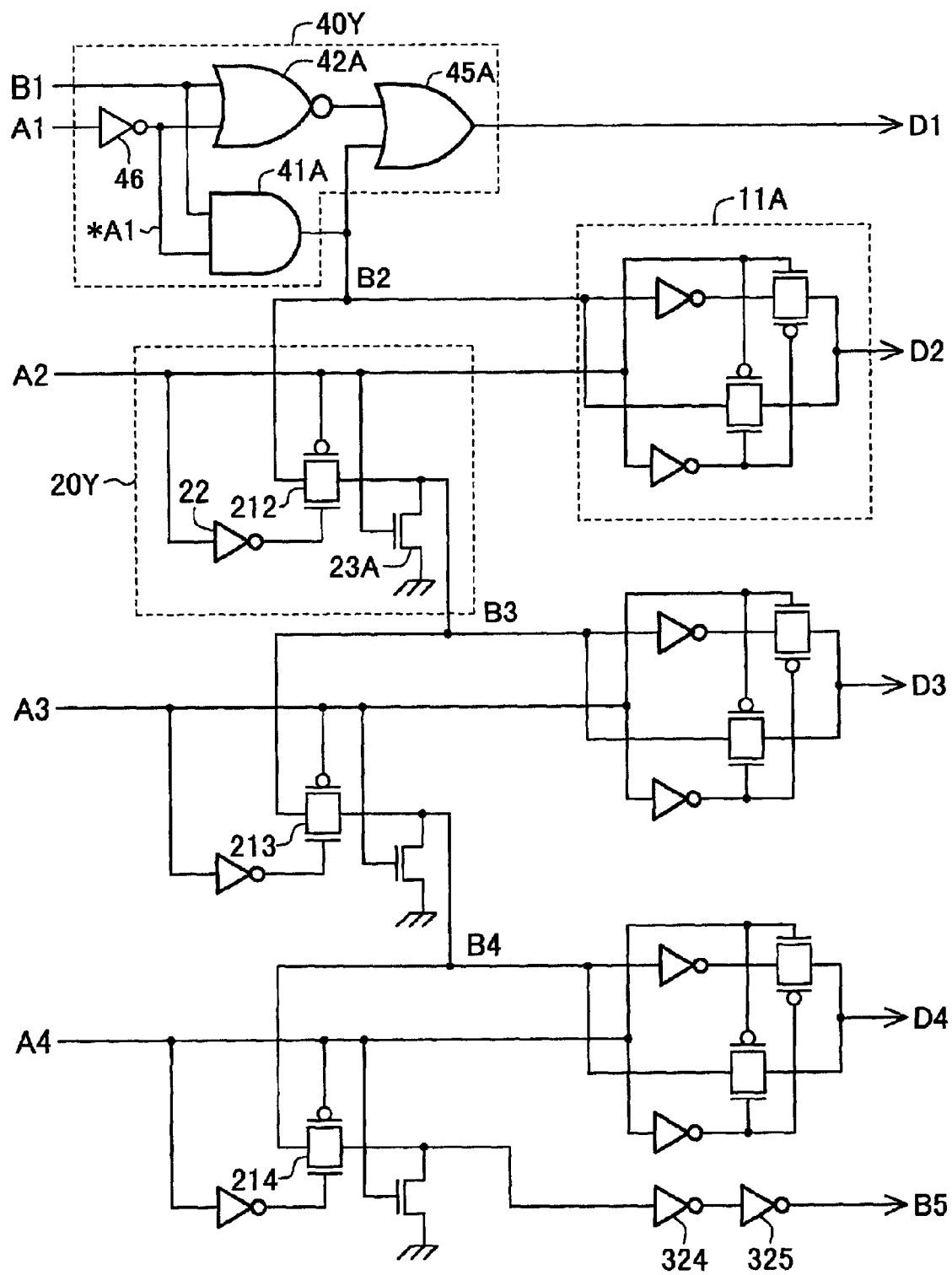
FIG. 10 is a circuit diagram showing a decrementer of a fifth embodiment according to the present invention.

FIG. 10 shows a decrementer of the fifth embodiment according to the present invention.

Since in this circuit, transfer gates 212 to 214 of binary borrow logic circuits 20Y for the upper three digits are connected in series to each other, borrow propagation is achieved at a high speed. A feature of this circuit is that a borrow-out bit to the upper side of each digit is a non-inverted signal.

In the half subtractor circuit 40Y for the least significant digit, an AND gate 41A is used instead of the NAND gate 41 of FIG. 9.

In order to effectively use the output of the inverter 41A in constitution of an exclusive-OR gate, a fixed bit B1='1' and a signal *A1 obtained by inverting an input bit A1 with the inverter 46 are provided to an NOR gate 42A, the outputs of the NAND gate 41A and the NOR gate 42A are provided to an OR gate 45A, and an output bit D1 is taken out from the OR gate 45A. The operation of the half subtractor circuit 40Y is represented by the following logic equation:

$$D1 = {}^*(B1 + {}^*A1) + B1 \cdot {}^*A1$$
$$= {}^*B1 \cdot A1 + B1 + {}^*A1.$$

Therefore, the half subtractor circuit 40Y also functions as an exclusive-OR gate.

In a binary borrow logic circuit 20Y for any other digit, the configuration thereof is different from the binary borrow logic circuit 20X of FIG. 9 in that an NMOS transistor 23A is connected between the data output of the transfer gate 212 and ground, and that the input bit A2 is provided to the gate of the NMOS transistor 23A.

When A2='0', the transfer gate 212 and the NMOS transistor 23A are on and off, respectively, to be B3=B2. When A2='1', the transfer gate 212 and the NMOS transistor 23A are off and on, respectively, to be B3='0' regardless of the value of the B2. Therefore, B3='1' only when A2='0' and B2='1', and B3='0' in the other cases. That is, the operation of the binary borrow logic circuit 20Y is represented by the following logic equation:

$$B3 = {}^*A2 \cdot B2. \tag{5}$$

Features of the binary borrow logic circuit 20Y in configuration are that on/off of the transfer gate 212 is inverse to that of the NMOS transistor 23A, and that the logic value of the source potential, 0V, of the NMOS transistor 23A is equal to the logic value of the borrow B2 which is in an inactive state, which are the same as those of the above described circuit of FIG. 1.

The borrow B2 and the input bit A2 are provided to the exclusive-OR gate 11A.

Further, the signal waveform on the data output of the transfer gate 214 for the most significant digit is shaped through inverters 324 and 325 to become a borrow B5.

Since the operation of the decrementer of FIG. 10 is apparent from the above description, description thereof is omitted.

Although preferred embodiments of the present invention has been described, it is to be understood that the invention is not limited thereto and that various changes and modifications may be made without departing from the spirit and scope of the invention.

For example, although in the above embodiments, description is given of a case where input bits and output bits are both of positive logic, the present invention also includes cases where one of the input bits or output bits is of negative logic and where both of the input and output bits are of negative logic. Further, a circuit for the least significant digit in an incrementer or a decrementer may be the same as that for an upper digit.

What is claimed is:

1. An incrementer comprising a plurality of half adder circuits each adding a carry-in bit to an input bit to generate an output bit and a carry-out bit, said plurality of half adder circuits being connected in cascade in regard to said carry-in and carry-out bits, each of said half adder circuits other than one for the least significant digit comprising:

a transfer gate, having a data input and a data output, turned on when said input bit is active, said data input receiving said carry-in bit;

a transistor, having a current channel connected between a power supply potential and said data output, a logic value of said power supply potential being equal to that of said carry-in bit in an inactive state, turned on when said input bit being inactive; and a logic circuit, generating said output bit which is active when either said input bit or said carry-in bit is active;

wherein said carry-out bit is on said data output.

2. The incrementer of claim 1, wherein said half adder circuit for the least significant digit comprises a NAND gate or an AND gate generating a carry-out bit.

3. The incrementer of claim 1, wherein said half adder circuit for the most significant digit further comprises an inverter connected to said data output thereof to shape a waveform of a signal of said carry-out bit.

4. The incrementer of claim 2, wherein said half adder circuit for the most significant digit further comprises an inverter connected to said data output thereof to shape a waveform of a signal of said carry-out bit.

5. A decrementer comprising a plurality of half subtractor circuits each subtracting a borrow-in bit from an input bit to generate an output bit and a borrow-out bit, said plurality of half subtractor circuits being connected in cascade in regard to said borrow-in and borrow-out bits, each of said half subtractor circuits other than one for the least significant digit comprising:

a transfer gate, having a data input and a data output, turned on when said input bit is inactive, said data input receiving said borrow-in bit;

a transistor, having a current channel connected between a power supply potential and said data output, a logic value of said power supply potential being equal to that of said borrow-in bit in an inactive state, turned on when said input bit being active; and a logic circuit, generating said output bit which is active when either said input bit or said borrow-in bit is active;

wherein said borrow-out bit is on said data output.

6. The decrementer of claim 5, wherein said half subtractor circuit for the least significant digit comprises a NAND gate or an AND gate generating a borrow-out bit.

7. The decrementer of claim 5, wherein said half subtractor circuit for the most significant digit further comprises an inverter connected to said data output thereof to shape a waveform of a signal of said borrow-out bit.

8. The decrementer of claim 6, wherein said half subtractor circuit for the most significant digit further comprises an inverter connected to said data output thereof to shape a waveform of a signal of said borrow-out bit.

* * * * *